United States Patent Office 3,378,384
Patented Apr. 16, 1968

3,378,384
REFRACTORY BRICK AND METHOD
OF MAKING
Joseph L. Stein, Cherry Hill, N.J., assignor to General
Refractories Company, Philadelphia, Pa., a corporation
of Pennsylvania
No Drawing. Filed Dec. 6, 1965, Ser. No. 512,007
13 Claims. (Cl. 106—65)

ABSTRACT OF THE DISCLOSURE

An unfired brick is prepared from a bloatable fire clay having a pyrometric cone equivalent of from 14 to 23, which has been precalcined to substantial densification but substantially free of bloating, with or without high alumina refractory filler and raw plastic clay, in defined proportions and particle sizes, the resulting brick being capable of bloating at elevated temperatures, as in a ladle lining, to form tight joints and fill in pits and crevices.

---

The present invention relates to an unfired refractory brick particularly adapted for use in steel ladles and the like wherein in service upon initial contact with molten metal it will undergo volumetric expansion—or bloating—to form tight joints and fill in pits and crevices. The invention also relates to a method for making such brick.

The desirability of expansion—or bloating—of the refractory ladle lining bricks during initial service is to provide tight joints in the refractory lining and to fill in other pits and crevices therein and to in general tighten the structure by keying in the lining to the shape of the metal shell. If molten metal should penetrate open joints or crevices in the lining and freeze therein, removal of the skull would tear away portions of the lining. The open joints are largely the result of the loose, inexpensixe construction of such linings dictated by the economics of a relatively short service life.

A common brick in use for ladle linings is a fired brick which is capable of such expansion or bloating at temperatures of about 2100° F. to 2600° F., temperatures below those encountered by the ladle lining when molten steel is tapped into the ladle from the steel-making furnace. At these temperatures the plastic nature of this brick insures the filling of cracks and oddly shaped and uneven spaces in the lining.

However, the manufacture and use of this conventional brick has certain limitations and disadvantages. The first is encountered when the clay is mined. The clay is a natural, bloating type clay having a pyrometric cone equivalent (PCE) of from 14 to 23 (Orton) and is termed "soft" to "semi-hard" clay. Such clays, upon being exposed to weather after mining, slake down losing much of their coarse particle size most desirable for brick manufacture and much of their bloating quality. This has required either immediate use of the clay to make brick or careful storing. In the second place, in making such brick they are fired—ideally—to the highest temperature possible for maximum density without bloating. Such firing conditions are, therefore, extremely critical and, in practice, many bricks are underfired and not sufficiently dense or are overfired and partially bloated, insufficiently dense and offsize. Furthermore, these brick have low refractoriness and wear relatively quickly in service. More highly refractory brick are available but these are more expensive, due to higher firing temperatures required, and their expansion is low and even this does not occur at the desirable low temperatures encountered in service.

It is the principal object of the present invention to provide a novel expandable refractory brick particularly adapted for use, without kiln firing, in making ladle linings and the like.

It is another object of the present invention to provide a novel refractory brick of the stated type which is consistent as to size, shape density and bloating qualities from brick to brick and from batch to batch.

A specific object of the present invention is to provide a novel brick of the stated type which, while highly refractory, expands at the desired temperatures below those encountered in service.

A further object of the present invention is to provide a method for making the stated brick wherein the clay, after mining, need not be used immediately for making brick or stored carefully and wherein there is no critical brick firing operation.

These and other objects will become apparent from a consideration of the following specification and claims.

The method of the present invention comprises precalcining bloatable fire clay having a pyrometric cone equivalent from 14 to 23 (Orton) to a temperature above 1700° F. but below its bloating temperature to densify said clay without bloating it substantially; and pressing bricks from a batch mix at least about 35% of the refractory material of which is said calcined bloatable clay having a particle size through a 3 mesh screen and on a 28 mesh screen. As will appear hereinafter, substantially all of the refractory material of the batch mix may be the calcined bloatable fire clay or up to about 65% thereof may be a highly refractory filler or a combination of highly refractory filler and a minor amount of raw plastic clay, so long as at least about 35% of the refractory material of the batch mix is the stated —3 +28 mesh calcined bloatable fire clay grains.

The resulting brick is thus an unfired brick body comprising at least a substantial portion of the described precalcined, bloatable fire clay grains.

The unfired brick of the invention may then be laid in a conventional manner to provide a ladle lining. In service and upon initial contact with molten metal poured into the ladle, the brick becomes heated to a temperature range of from 2100° F. to about 2600° F. depending upon the distance from the hot face of the brick, the hot face reaching the highest temperature. At these temperatures the brick undergoes marked volumetric expansion—bloating—closing joints and filling crevices. Since the raw bloatable clay itself is fired and not the brick, the bloatable clay can be calcined soon after mining, and pressing of the brick therefrom can be delayed as long as desired, even with the calcined bloatable clay being exposed to the weather, since deterioration is no longer a problem after calcining. Moreover, since, according to the present invention, the raw bloatable clay is fired and subsequently pressed into bricks, instead of firing brick pressed from raw bloatable clay, the bloatable clay is more readily heated uniformly to the desired temperature without danger of underfiring or overfiring. And since the brick is not fired as such before installation there is no danger of deleterious alterations in density, size or shape after pressing. Of great importance is the fact that highly refractory material can be mixed with the precalcined bloatable clay to provide a brick which, while bloatable at the desired temperatures stated above, has improved wear characteristics consistent with increased refractoriness.

The clay employed and precalcined according to the present invention will be as stated of the naturally bloating type. Such clays are usually fire clays having a pyrometric cone equivalent of 14 to 23 (Orton). They have a high alkali metal content; that is, from about 1 to about 4% of alkali metal oxides ($Na_2O$, $K_2O$ and $Li_2O$) by oxide analysis. These clays are also termed "soft" to "semi-hard" clays. It is characteristic of these bloatable clays that they undergo, upon heating, a progressive density change through three stages: (1) decrease in density due to removal of free and combined water in the temperature range up to about 1100° F.; (2) increase in density due to shrinkage in the temperature range from about 1100 to below about 1950° F., and (3) decrease in density due to bloating at temperatures above about 1950° F. and below about 2300° F. During stage 1 there is loss in weight at substantially constant volume, during stage 2 there is loss in volume at substantially constant weight, and during stage 3 there is volumetric expansion at substantially constant weight. During precalcining according to the present invention, the bloatable clay will be heated at least substantially into, and preferably substantially through, the second stage but not appreciably into the third stage.

Set forth in Table I below are bulk density data for typical bloatable clays after heating to various temperatures, in which the figures are bulk density in oz./cu. in. determined from −6+8 mesh grains.

TABLE I

|  | Bulk Density | |
| --- | --- | --- |
|  | Clay A | Clay B |
| Raw, as received | 1.49 | 1.49 |
| 1,000° F | 1.30–1.33 | 1.30–1.33 |
| 1,700° F | 1.39 | 1.39 |
| 1,800° F | 1.40 | 1.39 |
| 1,900° F | 1.41 | 1.43 |
| 1,950° F | 1.41 | 1.34 |
| 2,000° F | 1.39 | 1.37 |
| 2,100° F | 1.36 | 1.23 |
| 2,200° F | 1.31 | 1.22 |

It will be seen from the foregoing that the ideal condition for any particular bloatable clay is to calcine to maximum densification (without fusing) so as, in the final brick, to avoid shrinkage and obtain maximum bloating in service. In actual practice, however, such ideal conditions may not be economically achievable or feasible, and compromises may be called for which will result in at least substantial densification of the clay, to a thermally shrunken state, without appreciable bloating.

Precalcining of the bloatable clay may be accomplished in any suitable device including any one of a number of well known sintering machines or kilns which may be stationary or moving like a rotary kiln. After calcining, the clay may be stored, even in the open, for subsequent treatment and use.

Before pressing into brick, the calcined bloatable clay is sized. If the clay has been ground before calcining, the calcined material may only require screening. On the other hand, and as normally the case, the raw bloatable clay may be calcined in lump form so that the calcined material may require grinding and screening. In any event, the calcined bloatable clay employed in accordance with the present invention will pass through a 3 mesh screen, preferably through a 4 mesh screen. It has been found that the more coarse grains, and not the extremely fine material, account for the desirable bloating characteristics in brick made therefrom. Hence at least about 35%, preferably at least about 50% of the refractory material in the batch mix will be such coarse calcined bloatable clay having a particle size such that it is retained on a 28 mesh screen, preferably on a 20 mesh screen. The calcined bloatable clay finer than 28 mesh does not contribute significantly to the desirable bloating characteristics, and thus can advantageously be replaced, in whole or in part, by more highly refractory material as discussed more in detail hereinafter. However, in accordance with one embodiment of the invention substantially all of the refractory material in the batch mix may be the calcined bloatable clay, the coarse material being in an amount as defined above and the balance being calcined bloatable clay finer than 28 mesh.

The resulting batch mix may then be pressed into brick form. In accordance with conventional unfired, brick-making practice, a liquid "chemical" binder may be mixed with the grain material to hold it together after pressing and during handling upon transportation and installation. The present invention is not concerned with the nature of this binder, and it may be selected from a wide variety of organic and inorganic materials available for this purpose. Organic materials are exemplified by lignosulfonic acid and the various salt forms thereof, like sodium lignosulfonate and the corresponding potassium, calcium, magnesium, ammonium, and the like, salts. These are commercially available in solid and liquid forms. Inorganic chemical binders are exemplified by phosphoric acid, soluble silicates, like sodium and potassium silicates, combinations of phosphoric acid and hydrated alumina and of sulfuric acid and magnesite. Compatible combinations of organic and inorganic binders may be used, such as mixture of a lignosulfonate and sulfuric acid. In general, the binder will be present in an amount between about 1 and about 4%, by weight, on a dry, solids basis, based on the dry weight of refractory materials in the batch mix.

Water is also included in the mix to provide plasticity, lubrication and cohesion during pressing into brick form. Some or all of the water may be associated with the binder or it may be added separately as such. In any event, the water content of the pressable mix is generally from about 2 to about 5%, by weight, based on the dry weight of the refractory materials in the batch mix.

In accordance with preferred practice, there is also included, principally as a pressing aid and binder, some raw clay. This clay may be any plastic clay, including that which is prefired according to the present invention as well as more refractory clays, especially refractory fire clays having a pyrometric cone equivalent from about 31 to about 35. Ball clay and kaolin may also be used. The raw clay should have a particle size such that substantially all thereof passes through a 28 mesh screen. Generally, the amount of raw clay will not exceed about 15%, by weight, based on the dry weight of the refractory materials in the batch mix.

One of the important features of the present invention is that it permits the inclusion of refractory filler material high in alumina so as to increase the refractoriness of the resulting brick in service without detracting from bloatability. The refractory, high alumina filler will have a pyrometric cone equivalent from about 31 to about 38. Examples of such high alumina refractory fillers are aluminosilicates, such as calcined bauxite, mullite, kyanite (raw or calcined), calcined kaolin, calcined flint, calcined fire clay, sillimanite (raw or calcined) and the like. All these have an alumina content of at least 40%. Calcined bauxite is preferred. The refractory filler may be all coarse (through 3 mesh and on 28 mesh) or all fine (through 28 mesh) or a combination of coarse and fine, depending upon whether or not raw plastic clay is included, and the amount thereof, and upon the proportion of coarse and fine precalcined bloatable clay employed. As stated, of the total refractory materials in the batch mix (precalcined bloatable clay and any refractory filler and raw plastic clay) at least about 35%, preferably at least about 50%, will be the coarse precalcined bloatable clay. The total coarse refractory material in the batch mix should not exceed about 75%, and preferably does not exceed about 70%. The coarse refractory material in the batch mix may be made up entirely of coarse precalcined bloatable clay, as stated hereinabove, or may be made up of a combination of coarse precalcined bloatable clay, and coarse refractory filler. The balance of the refractory material in the batch mix will be fines and this may be the fine precalcined bloatable clay, fine refractory filler or raw plastic clay, or combinations thereof.

In preparing brick, the batch ingredients comprising the precalcined bloatable clay, chemical binder and moisture, and any raw plastic clay binder and/or refractory filler employed, are mixed and pressed into the desired brick shape. In accordance with conventional brick-making practice the brick body may be essentially rectangular with squared ends or may be of universal shape having one concave end and one convex end. The bricks may be made by pressing in a conventional brick-making press at pressures from about 5,000 to about 15,000 p.s.i., preferably about 10,000 p.s.i., or in an auger extruder, particularly at the higher moisture- and raw- clay contents.

The brick body is then dried to remove free water, as by heating to above the boiling point of water. The exact drying temperature employed, as known to those skilled in the art, may depend upon the particular chemical binder employed. For example, with soluble silicates and lignosulfonates the temperature is generally over 230° F., not exceeding about 600° F.; with the lignosulfonates and with phosphoric acid a suitable drying range is from about 400 to about 600° F. In any event there will be no sintering of the brick body so that the individual particles are not bonded through interfacial fusion; that is, the body will be devoid of ceramic bonds between individual refractory particles which made up the batch mix.

The following examples illustrate the present invention but are not intended to limit the scope of the invention in any way.

Examples 1–10

In these examples a bloatable fire clay having the characteristics of clay B as set forth in Table I above is calcined at about 1900–1950° F., ground and screened to provide particle sizes as set forth in the following tables, combined with various materials in amounts by weight as also set forth in the tables and pressed into brick at 10,000 p.s.i. The bricks were then subjected to various heat treatments and certain properties measured.

TABLE II

| Example | 1 | 2 | 3 |
|---|---|---|---|
| Precalcined clay (PCE 17) −4+8 mesh | 30 | | |
| Precalcined clay (PCE 17) −6+20 mesh | 30 | 60 | 40 |
| Precalcined clay (PCE 17) −35+100 mesh | | | 20 |
| Precalcined clay (PCE 17) −100 mesh | 30 | 30 | 30 |
| Raw kaolin, −48 mesh | 10 | 10 | 10 |
| | 100 | 100 | 100 |
| Phosphoric Acid (80%) (percent) | 4 | 4 | 4 |
| Batch moisture (percent) | 3.3 | 3.5 | 3.5 |
| After drying 24 hrs. at 400° F.: | | | |
| Pyrometric Cone Equivalent (Orton) | 18 | 18 | 18 |
| Bulk density, oz./cu. in | 1.23 | 1.23 | 1.21 |
| Modulus of rupture, p.s.i | 422 | 457 | 476 |
| Cold crushing strength, p.s.i | 3,097 | 3,011 | 3,197 |
| After 5 hrs. at 2,300° F.: | | | |
| Bulk density, oz./cu. in | 1.04 | 1.06 | 1.10 |
| Linear change, percent | 4.06E | 3.52E | 1.99E |
| Volume change, percent | 14.10E | 12.62E | 8.00E |
| After 5 hrs. at 2,550° F.: | | | |
| Bulk density, oz./cu. in | 0.86 | 0.87 | 0.93 |
| Linear change, percent | 11.97E | 11.46E | 7.99E |
| Volume change, percent | 40.18E | 38.13E | 28.56E |

TABLE III

| Example | 4 | 5 | 6 |
|---|---|---|---|
| Precalcined clay (PCE 17), −6+20 mesh | 65 | 65 | 65 |
| Precalcined clay (PCE-17), −48 mesh | 25 | 25 | 5 |
| Calcined bauxite, −48 mesh | | | 20 |
| Raw kaolin, −48 mesh | 10 | 10 | 10 |
| | 100 | 100 | 100 |
| Lignosulfonate binder* (percent) | 4 | 4 | 4 |
| Phosphoric acid (75%) (percent) | 0 | 1 | 1 |
| Batch moisture (percent) | 4.3 | 4.3 | 4.2 |
| After drying for 24 hours at 400° F.: | | | |
| Pyrometric Cone Equivalent (Orton) | 18±1 | 18±1 | 27±1 |
| Bulk density, oz./cu. in | 1.22 | 1.24 | 1.30 |
| Modulus of rupture, p.s.i | 258 | 481 | 485 |
| Cold crushing strength, p.s.i | 1,395 | 2,652 | 2,565 |
| Porosity, percent: | | | |
| Open | 17.20 | 14.91 | 15.78 |
| Closed | 2.05 | 2.58 | 2.50 |
| Total | 19.25 | 17.49 | 18.28 |
| After 5 hrs. at 2300° F.: | | | |
| Bulk density, oz./cu. in | 1.00 | 0.99 | 1.04 |
| Linear change, percent | 3.68E | 4.49E | 4.86E |
| Volume change, percent | 18.30E | 22.07E | 21.30E |
| After 5 hrs. at 2550° F.: | | | |
| Bulk density, oz./cu. in | 0.92 | 0.88 | 0.95 |
| Linear change, percent | 6.33E | 8.11E | 7.69E |
| Volume change, percent | 29.00E | 36.00E | 33.88E |

*As a 50% aqueous solution of mixed calcium and magnesium lignosulfonate.

Example 7

Example 5 is repeated, but omitting the raw kaolin, to provide a brick having comparable expansion characteristics.

Example 8

Example 6 is repeated, but omitting the −48 precalcined clay and increasing the −48 calcined bauxite to 25 parts to provide a brick having comparable expansion characteristics.

TABLE IV

| Example | 9 | 10 |
|---|---|---|
| Precalcined clay, −6+28 mesh | 54 | 54 |
| Precalcined clay, −28 mesh | 36 | 36 |
| Plastic fire clay (PCE 27–29) | 10 | 10 |
| | 100 | 100 |
| Hydrated alumina (percent) | | 4 |
| Phosphoric acid (80%) (percent) | 4 | 4 |
| Batch moisture (percent) | | 3.3 |
| After drying for 24 hours at 400° F.: | | |
| Bulk density, oz./cu in | 1.20 | 1.21 |
| Modulus of rupture, p.s.i | 320 | 506 |
| Cold crushing strength, p.s.i | 2092 | 2845 |
| After 5 hours at 2,300° F.: | | |
| Bulk density, oz./cu. in | 0.92 | 0.94 |
| Linear change, percent | 7.77E | 6.89E |
| Volume change, percent | 29.57E | 26.79E |
| After 5 hrs. at 2,550° F.: | | |
| Bulk density, oz./cu. in | 0.87 | 0.84 |
| Linear change, percent | 16.20E | 13.31E |
| Volume change, percent | 36.31E | 41.13E |

Modification is possible in the selection of materials and amounts thereof as well as in procedural techniques without departing from the scope of the present invention.

I claim:

1. The method of making a bloatable refractory brick which comprises pressing to brick form a moldable moist refractory batch mixture in which at least about 35%, by weight, of the refractory material is a bloatable fire clay having a pyrometric cone equivalent of from 14 to 23, calcined to substantial densification but substantially free of bloating and having a particle size through 3 mesh and larger than 28 mesh, the balance of the refractory material in said batch mixture being selected from the group consisting of bloatable fire clay having a pyrometric cone equivalent of from 14 to 23 calcined to substantial densification but substantially free of bloating and having a particle size through 28 mesh, high alumina refractory filler having a pyrometric cone equivalent from about 31 to about 38 and raw plastic clay, and combinations thereof, raw plastic clay being in an amount no more than about 15%, by weight, of the refractory material in the batch mixture, no more than about 75% of the refractory material in the batch mixture having a particle size larger than 28 mesh, the balance having a particle size through 28 mesh, and thereafter drying the brick without sintering.

2. The method of claim 1 wherein the moldable refractory batch mixture contains raw plastic clay having a particle size less than 28 mesh in an amount no more than about 15%, by weight, of the refractory material in the batch mixture.

3. The method of claim 1 wherein the moldable refractory batch mixture contains a high alumina refractory filler having a pyrometric cone equivalent from about 31 to about 38 in an amount no more than about 65%, by weight, of the refractory material in the batch mixture.

4. The method of claim 3 wherein the moldable refractory batch mixture contains raw plastic clay having a particle size less than 28 mesh in an amount no more than about 15%, by weight, of the refractory material in the batch mixture.

5. The method of claim 1 wherein said calcined bloatable clay having a particle size through 3 mesh and larger than 28 mesh makes up from about 35% to about 75% of the refractory material in the batch mix, and wherein the balance of the refractory material in the batch mix has a particle size through 28 mesh and is selected from the group consisting of bloatable fire clay having a pyrometric cone equivalent of from 14 to 23 calcined to substantial densification but substantially free of bloating, high alumina refractory filler having a pyrometric cone equivalent of from about 31 to about 38 and raw plastic clay, and combinations thereof, the raw plastic clay being in an amount no more than about 15%, by weight, of the refractory material in the batch mixture.

6. The method of claim 1 wherein at least about 50%, by weight, of the refractory material in the batch mixture is said bloatable fire clay having a particle size through 3 mesh and larger than 28 mesh, and wherein no more than about 70% of the refractory material in the batch mixture has a particle size larger than 28 mesh.

7. The method of claim 1 wherein said bloatable fire clay has been calcined at a temperature above 1700° F. but below its bloating temperature to densify said clay substantially without bloating it appreciably.

8. An unfired bloatable refractory brick especially adapted for use in constructing ladle linings and the like, comprising a dry, shaped body, substantially devoid of ceramic bonds, at least about 35%, by weight, of the refractory material of which is bloatable fire clay having a pyrometric cone equivalent from 14 to 23, calcined to substantial densification but substantially free of bloating and having a particle size through 3 mesh and larger than 28 mesh, the balance of the refractory material in said batch mixture being selected from the group consisting of bloatable fire clay having a pyrometric cone equivalent of from 14 to 23 calcined to substantial densification but substantially free of bloating and having a particle size through 28 mesh, high alumina refractory filler having a pyrometric cone equivalent from about 31 to about 38 and raw plastic clay, and combinations thereof, raw plastic clay being in an amount no more than about 15%, by weight, of the refractory material in the batch mixture, no more than about 75% of the refractory material in the brick having a particle size larger than 28 mesh, the balance having a particle size through 28 mesh.

9. The brick of claim 8 wherein there is present, raw plastic clay having a particle size less than 28 mesh in an amount no more than about 15%, by weight, of the refractory material.

10. The brick of claim 8 wherein there is present a high alumina refractory filler having a pyrometric cone equivalent from about 31 to about 38 in an amount no more than about 65%, by weight of the refractory material.

11. The brick of claim 10 wherein there is also present raw plastic clay having a particle size less than 28 mesh in an amount no more than about 15%, by weight, of the refractory material.

12. The brick of claim 8 wherein said calcined bloatable clay having a particle size through 3 mesh and larger than 28 mesh makes up from about 35% to about 75% of the refractory material, and wherein the balance of the refractory material has a particle size through 28 mesh and is selected from the group consisting of bloatable fire clay having a pyrometric cone equivalent of from 14 to 23 calcined to substantial densification but substantially free of bloating, high alumina refractory filler having a pyrometric cone equivalent of from about 31 to about 38 and raw plastic clay, and combinations thereof, the raw plastic clay being in an amount no more than about 15%, by weight, of the refractory material.

13. The brick of claim 8 wherein at least about 50%, by weight, of the refractory material is said bloatable fire clay having a particle size through 3 mesh and larger than 28 mesh, and wherein no more than about 70% of the refractory material has a particle size larger than 28 mesh.

References Cited
UNITED STATES PATENTS

| | | | |
|---|---|---|---|
| 2,660,536 | 11/1953 | West et al. | 106—67 |
| 2,852,401 | 9/1958 | Hansen et al. | 106—65 |

JAMES E. POER, *Primary Examiner.*